United States Patent [19]

Apsell

[11] Patent Number: 4,819,462

[45] Date of Patent: Apr. 11, 1989

[54] LOCKING CLAMP FOR A TRAILER TIRE-CARRYING WHEEL AND THE LIKE

[75] Inventor: Sheldon Apsell, Newton, Mass.

[73] Assignee: Micrologic, Inc., Watertown, Mass.

[21] Appl. No.: 47,198

[22] Filed: May 6, 1987

[51] Int. Cl.$^4$ .............................................. B62H 5/16
[52] U.S. Cl. ........................................ 70/14; 70/226; 70/232
[58] Field of Search ................... 70/14, 18, 19, 54–56, 70/237, 232, 225, 226, 20, 30, 49, 15, 58, 234, 259

[56] References Cited

U.S. PATENT DOCUMENTS

| | | | |
|---|---|---|---|
| 1,832,782 | 11/1931 | Leupen | 248/354.5 X |
| 2,077,698 | 4/1937 | Hurd | 70/232 |
| 2,844,954 | 7/1958 | Marugg | 70/225 |
| 3,537,548 | 11/1970 | Jeppesen | 70/225 |
| 3,581,846 | 6/1971 | Janus | 70/225 |
| 3,695,071 | 10/1972 | West | 70/225 |
| 3,805,564 | 4/1974 | Velardo | 70/54 X |
| 3,810,370 | 5/1974 | Jeppesen | 70/225 |
| 3,828,590 | 8/1974 | Thiebault | 70/225 X |
| 3,868,837 | 3/1975 | Quimby | 70/18 X |
| 4,031,726 | 6/1977 | De Jager | 70/226 |
| 4,441,586 | 4/1984 | Bernier | 70/225 X |
| 4,581,907 | 4/1986 | Eberly | 70/54 |
| 4,649,724 | 3/1987 | Raine | 70/226 |
| 4,723,426 | 2/1988 | Beaudoin | 70/226 X |

FOREIGN PATENT DOCUMENTS

| | | | |
|---|---|---|---|
| 2520683 | 8/1983 | France | 70/226 |
| 0076348 | 5/1983 | Japan | 70/225 |
| 0076349 | 5/1983 | Japan | 70/225 |
| WO86/05150 | 9/1986 | PCT Int'l Appl. | 70/237 |
| 2103164 | 2/1983 | United Kingdom | 70/237 |
| 2106058 | 4/1983 | United Kingdom | 70/226 |
| 2180806 | 4/1987 | United Kingdom | 70/237 |

Primary Examiner—Lloyd A. Gall
Attorney, Agent, or Firm—Rines and Rines, Shapiro and Shapiro

[57] ABSTRACT

A locking clamp for a wheel secured by external lug bolts to an axle of a trailer or other vehicle and having an inner annular hub peripherally surrounded by a tire, the clamp having, in combination, first and second interlocking L-shaped members, the first member comprising a chock as one leg and carrying a tubular bar the inner surface of which is to be juxtaposed against the rear of the tire, and the other leg of which extends inwardly of the inner tire side surface; and the second member comprising an L-shaped tubular bar the front leg of which is of cross-section less than that of the first member tubular bar in order to slide through the same and extend inwardly therebeyond, with the other leg extending parallel to the said other leg of the first member but across the outer side of the tire and carrying a hub disc adjustable to cover the wheel outer hub lug bolts and prevent access to the same; and means at the inward extension of the second member front leg for receiving locking means.

10 Claims, 2 Drawing Sheets

LOCKING CLAMP FOR A TRAILER TIRE-CARRYING WHEEL AND THE LIKE

BACKGROUND OF THE INVENTION

The present invention relates broadly to vehicle wheel clamping devices, being more particularly directed, however, to the locking-clamping of boat or other trailer tire-carrying wheels and other vehicular wheels for such purposes as preventing stealth or moving of the same.

The art is replete with devices for clamping or otherwise locking vehicle wheels, ranging from simplistic chains and spoke-receiving extension locks, to the massive "boot" or clamp structures applied by the police to automobile front wheels for parking or other violations.

There are occasions, however, as in the case of boat trailers and similar vehicular systems where these prior techniques are not well-suited to the owner's facile and ready application of a wheel-locking apparatus and simple removal of the same. The most customary boat trailer locks have been directed to chain or other locking of the latch that hooks to the ball socket in the back of a bumper of a towing vehicle, but this technique can be rather readily defeated. The massive and expensive police clamps are also not suited for the boat-trailer owner. The present invention, accordingly, is directed to providing a locking clamp for a trailer wheel or the like that is far from massive but yet totally effective, and is readily applied and removed by the owner without special devices or man-handling adjustments and that is secure from lock cutting equipment and from attempts to remove the locked wheel, and in addition permits a wide range of adjustment for different-sized wheels and tires.

SUMMARY OF THE INVENTION

An object of the invention thus is to provide a new and improved wheel locking clamp structure for preventing movement of a wheeled vehicle and that, while particularly adapted for tired wheels of the type used in boat trailers and the like, is also useful for related structures, and is void of the problems above-described and others attendant upon prior locking systems.

A further object is to provide such a novel wheel locking clamp that is simple in construction, of relatively low cost and that permits facile and rapid adjustment and fitting to wheels and tires of varying dimensions.

Other and further objects will be explained hereinafter and are more fully delineated in the appended claims.

In summary, however, from one of its important aspects, the invention embraces a locking clamp for a wheel secured by external lug bolts to an axle of a trailer or other vehicle and having an inner annular hub peripherally surrounded by a tire, the clamp having, in combination, first and second interlocking L-shaped members, the first member comprising a chock carrying a tubular bar as one leg and the inner surface of which is to be juxtaposed against the rear of the tire, and the other leg of which extends inwardly of the inner side tire surface and carries a rear spacer adjustable to bear against the hub on its inner surface; and the second member comprising an L-shaped tubular bar the rear leg of which is of cross-section less that that of the first member tubular bar in order to slide through the same and extend inwardly therebeyond across the said rear of the tire, with the other leg extending parallel to the said other leg of the first member but across the outer side of the tire, and carrying a hub disc adjustable to cover the wheel outer hub lug bolts and prevent access to the same; and means at the inward extension of the second member rear leg for receiving locking means. Preferred and best mode embodiments will hereinafter be detailed.

BRIEF DESCRIPTION OF THE DRAWING

The invention will now be described with reference to the accompanying drawings, FIG. 1 of which is an isometric view illustrating a preferred form in use on a tired-wheel, shown dotted.

DESCRIPTION OF THE PREFERRED EMBODIMENTS

Figure 1:
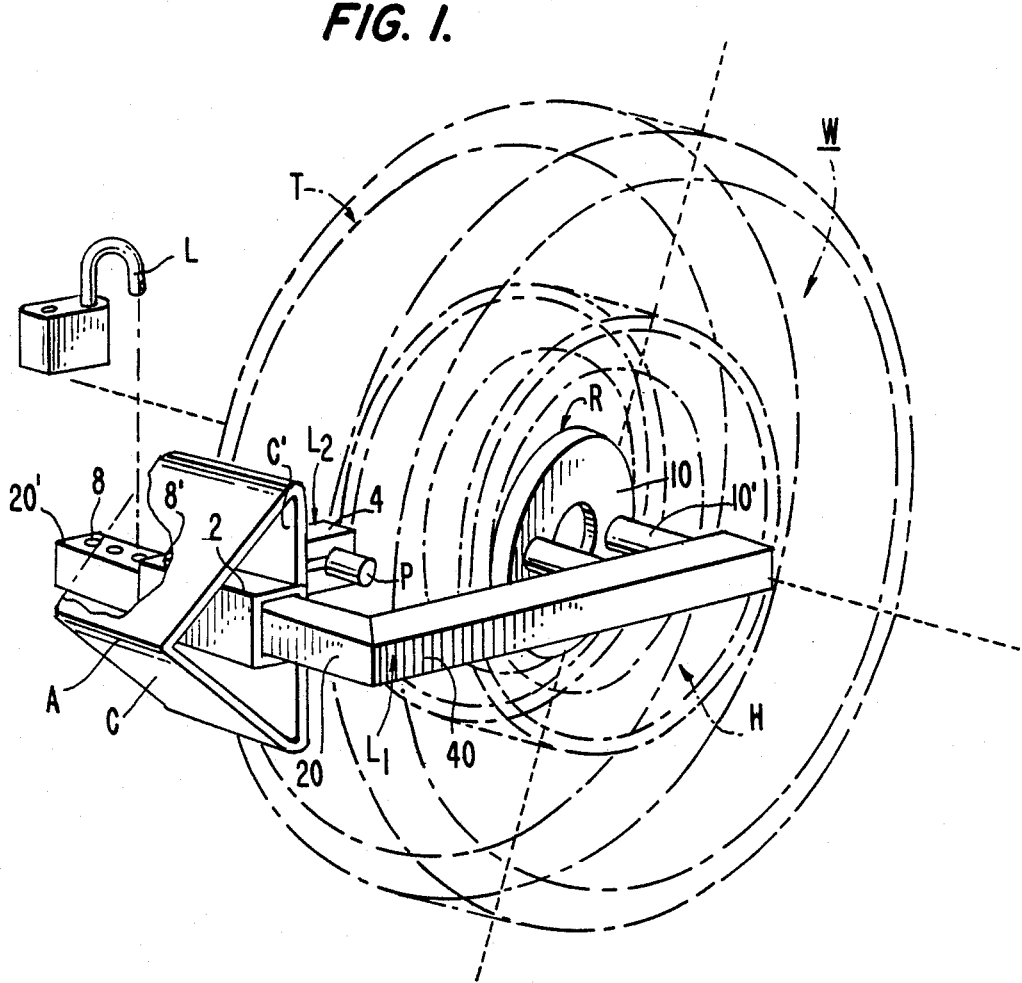
Figure 2:
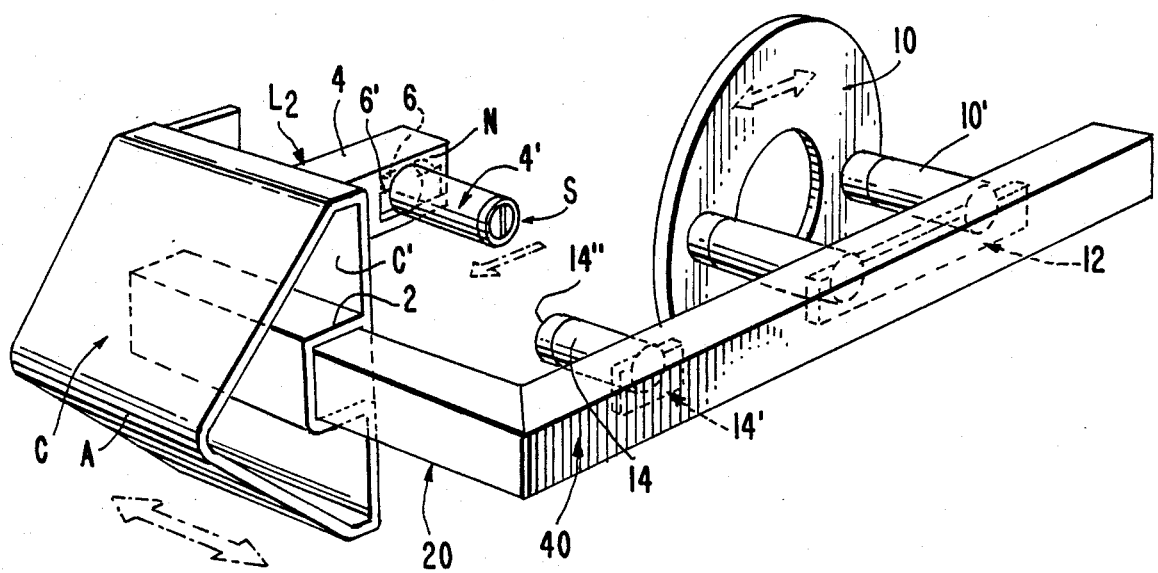
FIG. 2 is a more detailed similar view.

Referring to FIG. 1, the locking clamp is shown as comprising two generally L-shaped members $L_1$ and $L_2$ clamping a boat trailer or similar vehicular wheel W, shown dotted, comprising a conventional rubber tire T peripherally mounted on an inner metal annular hub H secured to the vehicle axle by conventional externally tightened lug bolts (not shown) in the region R. The rearwardly mounted or inner member $L_2$ comprises as one leg a chock C, shown as a tubular triangular construction and carrying a tubular bar 2 centrally of its forward or base surface opposite its apex, applied to be juxtaposed against and parallel to the plane of the rear of the tire T, as more particularly shown in FIG. 1. The other leg of the member $L_2$ extends perpendicularly inward from the chock leg C along the inner side surface of the wheel tire at 4, serving as a rear bar, also preferably in the form of a tube, and again illustratively shown of rectangular configuration. A rear spacer 4', FIG. 2, lockable at adjustable positions along the rear bar leg, as by a backing nut 6 slidable along a slot 6' that extends axially parallelly along the leg 4, is adjusted to engage preferably the metal part of the hub inner surface, insofar as possible, at the point P, FIG. 1, where the deepest part of the wheel begins to flare out towards the rubber tire. In application, with the chock assembly in position, the rear spacer 4' is slid tightly into the wheel hub and is tightened by a machine screw S provided at the inner end of the spacer 4' and tightening into the backing nut 6.

Figure 3:
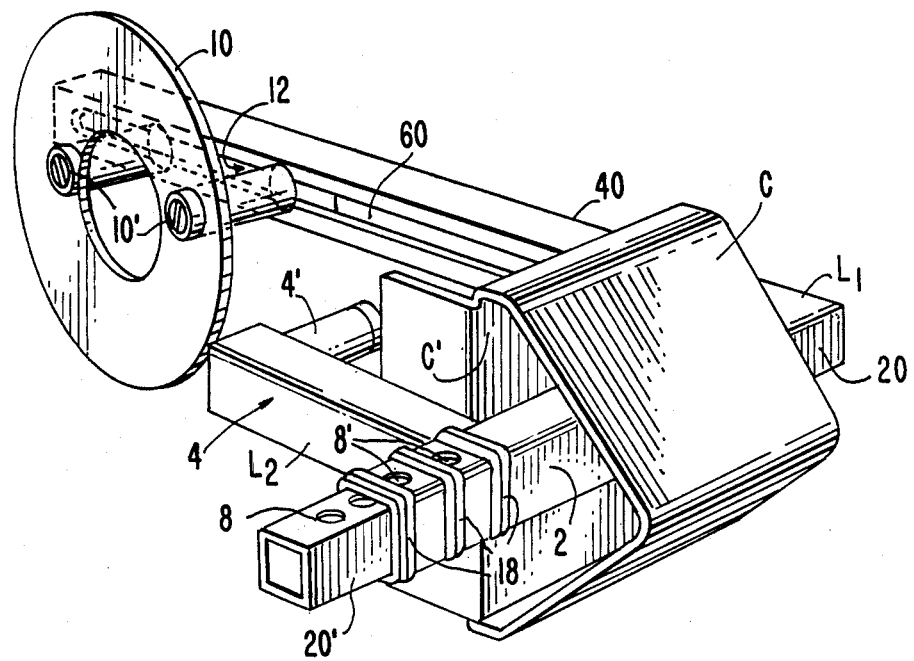
FIG. 3 is an isometric of the assembled locking clamp looking toward the inner side surface of the wheel.

The front member $L_1$ comprises right-angularly bent hollow tubular legs 20, 40 (also illustratively shown of rectangular configuration) the leg 20 of which is of cross-sectional dimension slightly less than the tubular leg element or bar 2 of the chock assembly in order to be inserted and slid therethrough and to extend inwardly therebeyond as at 20', FIGS. 1 and 3, with apertures or holes 8 to receive a lock shaft L, as later discussed. The leg 40 is shown extending parallelly to the rear leg 4 of the member $L_2$ (to the right in the drawing) and across the outer side of the tire T. The leg 40 inwardly carries a hub disc 10 that is adjusted to cover the region R of the wheel lug bolts, FIG. 1, so as to prevent external access to the same and inhibit removal of the locked wheel from the vehicle. This adjustment is shown effected by hub disc spacers 10' that can be secured to a backing plate 12 slidable through and along the longitudinal slot 60, FIG. 3, on the inner wall of the tubular leg 40. With the front bar leg 40 positioned parallel to the side plane of the tire, against either the tire sidewall or the axle, whichever protrudes outward further, and appropriate spacers 10', the hub disc cover 10 may be slid along slot 60 until the inner slide bar is against the tire and the hub disc 10 is centered over the axle and surrounding region R. Machine screws shown at the free ends of the spacers 10' (FIG. 3) are provided so that the disc cover may be secured in its adjusted position to the front bar 40. If there is any space between the tire sidewall and the front bar leg 40 of member $L_1$, a further adjustable front spacer 14 may be employed of appropriate dimension, set at a point of the front leg 40 where the tire sidewall and the leg are closest, and adjustable along slot 60 and securable in backing nut 14' by a machine screw 14".

Installation procedure may be as follows:

With the chock member assembly $L_2$ in one hand and the front bar assembly member $L_1$ in the other, the chock assembly is placed in position behind the wheel, FIG. 1. The inner slide bar leg 20 is passed into the chock assembly outer slide bar 2 and the front bar 40 and hub disc 10 are moved tightly against the wheel. Holding the inner slide bar 20 from slipping with one hand, the lock L is inserted into later-described holes 8' in the outer slide bar 2 and through locking holes 8 in the slide bar extension 20', tightly interlocking the assembly in position. The hub disc 10, which is adjusted to fit tightly against the wheel lug bolts at region R, sufficiently covers the area R to prevent the loosening or removal of the lug bolts holding the wheel to the axle. The hub disc spacer 10' is selected for the correct size(s) to set the hub disc against the lub bolts simultaneously with the front bar 40 touching the front tire sidewall. The location of the lock L sets the clamp width to match the tire width, and the outer slide bar 2 in accepting the inner slide bar 20 allows one dimension of motion only; an in/out adjustment to set the width to match the tire width. The before-mentioned locking holes 8' are provided in the bar 2 (FIG. 3) on a greater spacing than that of the holes 8 of the extension 20' such that, in conjunction with the corresponding holes 8 on the inner slide bar extension at 20, the flexibility of the resolution of position for locking is improved. As an example, the locking holes 8 may have a ⅝" spacing, and the holes 8', a 25/32" spacing, permitting an effective 5/32" spacing adjustment resolution. The holes 8' in the bar 2, moreover, are shown bounded by flanges 18 that prevent the insertion of lock cutters.

The chock C may be welded to the outer slide bar 2, serving to provide the block between the tire and the ground to prevent rotation of the tire. Similarly, the rear bar 4 may be welded to the chock C and the outer slide bar 2. It, in conjunction with the front bar 40, clamps the tire and retains the relative clamp/wheel positions. In addition, it provides a moment arm to prevent motion of the hub disc 10 away from the lug nuts/bolts. The rear spacer 4', moveover, as before stated, is selected to provide a close fit between the rear bar 4 and the inner edge of the metal portion of the wheel, providing a pivot point to prevent rotation of the clamp away from the lug nuts/bolts. In addition, it prevents the unit from sliding off the tire away from the axle.

Further modifications will occur to those skilled in the art and such are considered to fall within the spirit and scope of the invention as defined in the appended claims.

What is claimed is:

1. A locking clamp for a wheel secured by external lug bolts to an axle of a trailer or other vehicle and having an inner annular hub peripherally surrounded by a tire, the clamp having, in combination, first and second interlocking L-shaped members, the first member comprising a chock and carrying a tubular bar as one leg and the inner surface of which is to be juxtaposed against the rear of the tire, and the other leg of which extends inwardly of the inner side tire surface and carries a rear spacer adjustable to bear against the hub on its inner surface; and the second member comprising an L-shaped tubular bar, the rear leg of which is of cross-section less than that of the first member tubular bar in order to slide through the same and extend inwardly therebeyond across the said rear of the tire, with the other leg extending parallel to the said other leg of the first member but across the outer side of the tire, and carrying a hub disc adjustable to cover the wheel outer hub lug bolts and prevent access to the same, and means at the inward extension of the second member rear leg for receiving locking means.

2. A locking clamp as claimed in claim 1 and in which the first member tubular bar and the second member rear leg inward extension are provided with cooperative apertures for receiving locking means passing therethrough.

3. A locking clamp as claimed in claim 2 and in which the apertures of the first member tubular bar and those of the second member rear leg inward extension are of different spacing to provide flexible resolution in locking positions.

4. A locking clamp as claimed in claim 2 and in which the first member tubular bar is provided with flange means between apertures to prohibit the insertion of lock cutters.

5. A locking clamp as claimed in claim 1 and in which the hub disc cover is mounted inward of the second member other leg by spacer means.

6. A locking clamp as claimed in claim 5 and in which the spacer means is secured to a backing plate carried by the said second member other leg at adjustable positions therealong and securable to the said hub isc at its inner surface that is juxtaposed to the wheel hub lug bolts to prevent access thereto.

7. A locking clamp as claimed in claim 6 and in which the backing plate is slidably disposed within the said second member other leg with the spacer means slidable along a slot of said second member other leg.

8. A locking clamp as claimed in claim 1 and in which the said first member rear spacer is secured through a slot to a backing nut disposed in the said first member other leg.

9. A locking clamp as claimed in claim 1 and in which the second member other leg is provided with front spacer means adjustably positionable along a lengthwise portion of the second member other leg and extending inwardly toward the outer side surface of the tire between the rim of the tire and the hub disc.

10. A locking clamp as claimed in claim 1 and in which the chock is of triangular tubular shape with its forward edge defining an apex of the triangle and its inner base surface being inwardly provided with the first member tubular bar.

* * * * *